Feb. 13, 1962  J. L. SZAJNA  3,020,595
HOLLOW PLASTIC ARTICLE MOLDING MACHINE
Filed Aug. 29, 1958  2 Sheets-Sheet 1
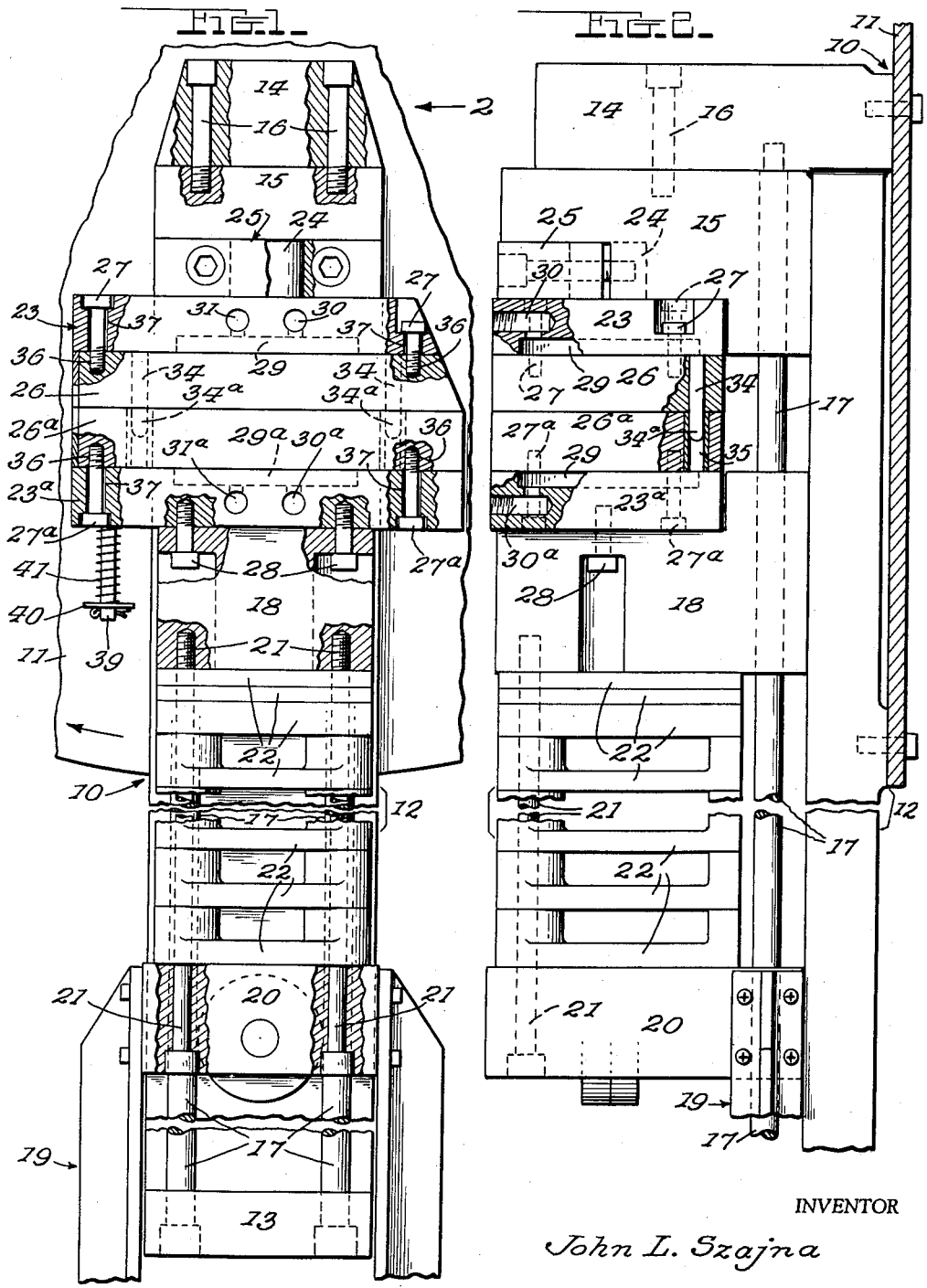
INVENTOR
John L. Szajna
BY
Nesim, Porter, Diller & Stewart
ATTORNEYS Feb. 13, 1962   J. L. SZAJNA   3,020,595
HOLLOW PLASTIC ARTICLE MOLDING MACHINE
Filed Aug. 29, 1958   2 Sheets-Sheet 2
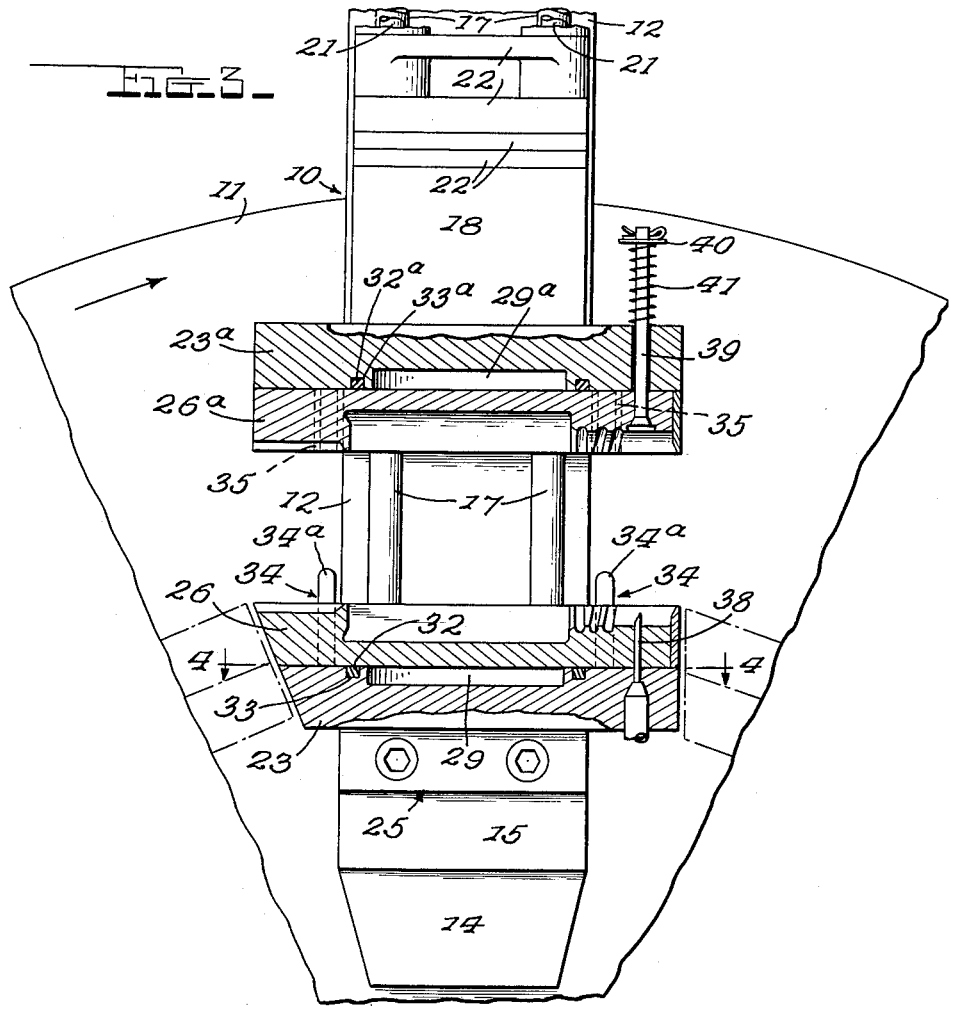
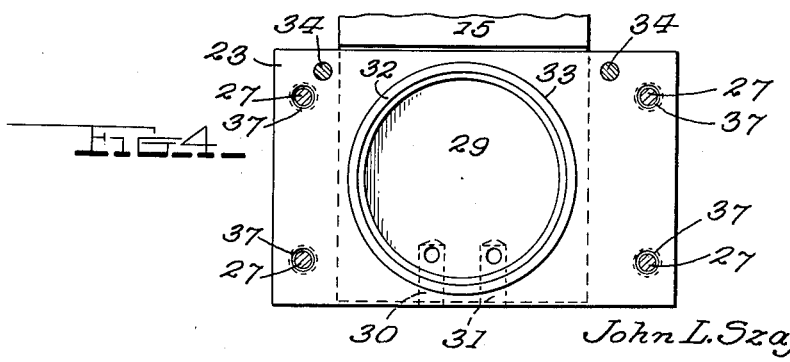
INVENTOR
John L. Szajna
BY
Mason, Porter, Diller & Stewart
ATTORNEYS United States Patent Office 3,020,595
Patented Feb. 13, 1962

3,020,595
HOLLOW PLASTIC ARTICLE MOLDING MACHINE
John L. Szajna, Norridge, Ill., assignor to Continental Can Company, Inc., New York, N.Y., a corporation of New York
Filed Aug. 29, 1958, Ser. No. 758,009
3 Claims. (Cl. 18—42)

This invention relates to improvements in machines of known general type in which hollow plastic articles are molded by entrapping lengths of freshly extruded plastic tubing between mold halves, inflating the entrapped tubing lengths to expand them into conformity with the molding cavities, and chilling the mold halves to set the plastic. An example of such a machine is found in United States Patent No. 2,784,452, issued March 12, 1957, to Herbert S. Ruekberg and John L. Szajna: and the present invention has been disclosed as embodied in this machine.

The present invention aims primarily to provide a new and improved construction in which each of two mold half carrying blocks has a coolant receiving recess in its mold half engaging side, and in which the mold half spans said recess and cooperates therewith in forming a chamber through which to circulate the mold chilling fluid. It is not therefore necessary to provide any sets of molds manufactured for use in the machine, with any provision for receiving the coolant, and cost of such mold sets is therefore reduced. Moreover, better mold chilling is effected as the backs of the mold halves are directly wetted by the coolant.

Another object of the invention is to provide for strict alignment of the mold halves at the factory, to maintain such alignment during installation of the mold set in the machine, and to assure true alignment during machine operation.

With the above and other objects in view that will hereinafter appear, the nature of the invention will be more clearly understood by reference to the following detailed description, the appended claims and the several views illustrated in the accompanying drawings.

In the drawings:

FIGURE 1 is a fragmentary front elevation partly in section showing the invention embodied in a machine constructed generally in accordance with the above mentioned patent. In this view, the mold is shown closed and traveling with the lower portion of the machine rotor.

FIGURE 2 is a view looking in the direction of the arrow 2 of FIGURE 1 and partly in section.

FIGURE 3 is a view similar to FIGURE 1 but showing the mold halves and cooling members in longitudinal section. Also, in this view, the mold halves are shown during relative opening thereof and travelling with the upper portion of the rotor.

FIGURE 4 is a horizontal sectional view on line 4—4 of FIGURE 3.

The improvements of the present invention have been disclosed as embodied in the above identified patented machine, principally for environment, and may be employed wherever advantageously usable. For clarity, the pertinent elements of the old machine will be briefly explained.

The machine includes a rotor 10 comprising a disk 11 and a plurality of radial arms secured to said disk. Only one of these arms is shown and this arm is identified at 12. The outer end of the arm 12 has a lug 13 (FIGURE 1) and the inner end of said arm has a lug 14. An inner mold mounting block 15 is secured by screws 16 to the inner lug 14: and two guide rods 17 are carried jointly by the two lugs 13 and 14. An outer mold mounting block 18 is slidable on the rods 17: and a cam-actuated yoke 19 is provided for moving said block 18 toward and from the block 15. This yoke 19 has an inner end block 20 connected with the inner mounting block 18 by tie bolts 21 and various spacers 22.

An inner mold half cooling and carrying block 23 is rigidly attached to the mounting block 15. This block 23 is shown as provided with a rigid stud 24 and the block 15 with a stud holding clamp 25 for attaching said block 23 to the block 15. An inner mold half 26 is detachably secured by screws 27 to the block 23.

An outer mold half cooling and carrying block 23a is rigidly attached to the outer mounting block 18, for example by screws 28: and an outer mold half 26a is detachably secured by screws 27a to said block 23a.

The mold half cooling and carrying block 23 has a coolant receiving recess 29, an inlet 30 for said recess, and an outlet 31 for said recess. Also, the outer mold half cooling and carrying block 23a has a coolant receiving recess 29a, a coolant inlet 30a and a coolant outlet 31a. The recesses 29 and 29a are in the form of shallow sockets which are spanned by and cooperate with the mold halves 26 and 26a, respectively, in forming coolant receiving chambers for the purpose of chilling the two mold halves to set the plastic after it has been shaped by the mold halves. The inlets (30 and 30a) and the outlets (31 and 31a) of these chambers are connected with coolant circulating lines of the machine and remain connected when changing molds.

An elastic gasket 32 surrounds the recess 29 and is preferably in the form of an O-ring received in a continuous groove 33 formed in the inner block 23. Also, an elastic gasket 32a surrounds the recess 29a and is preferably in the form of an O-ring inset in a groove 33a in the outer block 23a. When the mold halves 26 and 26a are secured to the blocks 23 and 23a respectively, the gaskets 32 and 32a become compressed and prevent leakage of coolant from the recesses 29 and 29a.

By forming the coolant receiving recesses 29 and 29a in the mold facing sides of the mold half cooling and carrying blocks 23 and 23a and having the mold halves span said recesses and coact therewith in forming coolant chambers, the construction of the mold halves is greatly simplified, as they need have no provision for receiving the coolant. The cost of various mold sets to be used in the machine is therefore materially decreased. Moreover, the backs of the mold halves are directly wetted by the coolant fluid and thus the cooling of the mold is more efficient. If the coolant chambers were made entirely within the blocks 23 and 23a, instead of being formed in part by the mold halves, the cooling of these mold halves would be affected by the parting line surfaces between the backs of said mold halves and said blocks 23 and 23a, as any oil or foreign matter on these surfaces would change the rate of heat transfer and therefore the cooling rate would not be as predictable as when the backs of the mold halves are directly wetted.

Provision is made for accurately aligning the two mold halves 26 and 26a with each other both when initially attaching them to their respective carrying blocks 23 and 23a and during operation of the machine. One of the mold halves rigidly carries two projecting hardened aligning pins 34 which are parallel with the direction in which the outer mold half 26a moves with respect to the inner mold half 26 during operation of the machine. The other mold half has two hardened bushings 35 tightly inset therein to accurately receive the projecting ends 34a of the pins 34 when the two mold halves are relatively closed. In the present disclosure, the aligning pins 34 are carried by the inner mold half 26 and the bushings 35 by the outer half 26a.

It is an easy matter, at the mold factory, to provide any set of matched mold halves to be used in the machine, with the aligning pins 34 and bushings 35. These pins and bushings will then hold the mating mold halves assembled during delivery, will hold them aligned during installation in the machine, and will assure alignment during machine operation.

The mold halves 26 and 26ª are drilled and tapped at the factory to provide sockets 36 to receive the attaching screws 27 and 27ª. The openings 37 of the blocks 23 and 23ª through which these screws extend, are drilled oversize to allow for any slight inaccuracy in the location of the sockets 36 but after the screws are tightened, the mold halves 26 and 26ª cannot creep from their set positions.

The needle which injects compressed air into the mold-entrapped length of plastic tubing to expand it into the mold, is shown at 38 in FIGURE 3. Also, a suitable ejector or knock-out pin for the molded article is shown at 39. As illustrated, this pin is associated with the outer movable mold half 26ª but it could well be associated with the inner fixed mold half 26 as in the patent above referred to. The pin 39 has a detachable abutment 40 against which its retracting spring 41 thrusts; and removal of said abutment and spring permit removal of the pin when changing molds.

Whenever molds are to be changed, the securing screws 27 and 27ª for the two mold halves 26 and 26ª are removed; and the ejector or knock-out pin 39 and its spring 41 are also removed, permitting quick and easy removal of said mold halves without disturbing the mold half carrying and cooling blocks 23 and 23ª and the coolant circulating lines connected thereto. Then, other mold halves, substantially duplicating the removed mold halves except for size and/or shape of the molding cavities, may be easily substituted. Then, the ejector or knock-out pin 45 and its spring 47 may be readily replaced and the machine is again in readiness for operation.

From the foregoing it will be seen that novel and advantageous provision has been disclosed for attaining the desired ends. However, attention is invited to the possibility of making variations within the scope of the invention as claimed.

I claim:
1. In a molding machine, two mold half carrying blocks mounted for movement toward and away from each other, the opposed sides of said blocks each having a coolant receiving recess opening therethrough, each of said blocks also having an inlet and an outlet opening into its respective recess, a coolant supply line and a coolant return line connected to each block in communication with said coolant inlet and said coolant outlet, respectively, two cooperating mold halves, said mold halves having cooperating aligning pins and bushings for initially aligning said mold halves, said mold halves having remote sides conforming to and contacting said opposed sides of said blocks in sealed relation about said recesses, said mold halves spanning and coacting with said recesses to form two coolant receiving chambers whereby coolant circulated through said coolant chambers is in direct contact with said mold halves, and means laterally adjustably and detachably securing said mold halves to said blocks.

2. The structure of claim 1 wherein the seal between each mold half and its respective block includes a flat surface of the mold half opposing its respective block, a continuous groove in the block surrounding the recess of the block, and a continuous gasket seated in the recess and engaging the mold half flat surface, whereby relative shifting of each mold half with respect to its respective block may be had for aligning the mold halves and the required seals accomplished after the mold halves have been aligned.

3. In a mold, a replaceable mold half having a molding cavity which opens through one side of said mold half, a mold half carrying and cooling member for attachment to a mold half mounting member of a molding machine, said mold half carrying and cooling member being in the form of a flat block having a recess in one face thereof, said mold half having a flat second side remote from said one side and being in contact with said one face of said flat block, said mold half carrying and cooling member having a continuous groove formed in said one face and extending around said recess, a gasket seated in said groove, said gasket being formed of an elastic material and having a height greater than the depth of said groove whereby said gasket projects out of said groove when released, bolt means loosely carried by said mold half carrying and cooling member releasably and adjustably clamping said mold half second side against said mold half carrying and cooling member one face with said gasket engaging said mold half second side and forming a seal therewith, the walls of said recess cooperating with said mold half second side in forming a coolant chamber whereby coolant in said coolant chamber may directly contact said mold half, said mold half carrying and cooling member having a coolant inlet and a coolant outlet for said recess.

References Cited in the file of this patent
UNITED STATES PATENTS

| | | |
|---|---|---|
| 993,970 | Droitcour | May 30, 1911 |
| 1,290,105 | Davenport | Jan. 7, 1919 |
| 2,128,239 | Ferngren | Aug. 30, 1938 |
| 2,206,276 | Chaplin | July 2, 1940 |
| 2,440,321 | Bacon | Apr. 27, 1948 |
| 2,435,170 | Wachs et al. | Jan. 27, 1948 |
| 2,451,992 | Grotenhuis | Oct. 19, 1948 |
| 2,515,093 | Mills | July 11, 1950 |
| 2,251,785 | Dons et al. | Aug. 5, 1951 |
| 2,579,399 | Ruekberg | Dec. 18, 1951 |